US006338226B1

(12) United States Patent
Gauthier et al.

(10) Patent No.: US 6,338,226 B1
(45) Date of Patent: Jan. 15, 2002

(54) MODULAR SOLARIUM KIT COMPRISING FRAME MEMBERS WITH ARCUATE RECESSES AND FLEXIBLE, HEAT SHRINKING WINDOW PANELS WITH LOCKING EDGE FRAMES

(75) Inventors: Mario Gauthier, 3475 rue De Lausanne, Terrebonne, Quëbec (CA), J6X 4A3; Jean Saint-Amour, Terrebonne (CA)

(73) Assignee: Mario Gauthier, Terrebonne (CA)

( * ) Notice: Subject to any disclaimer, the term of this patent is extended or adjusted under 35 U.S.C. 154(b) by 0 days.

(21) Appl. No.: 09/419,625

(22) Filed: Oct. 18, 1999

(51) Int. Cl.$^7$ ................................................. E04B 1/00
(52) U.S. Cl. ............................... 52/63; 52/222; 52/273; 52/646; 52/DIG. 17; 47/17
(58) Field of Search ........................... 52/63, 222, 273, 52/DIG. 17, 645, 646; 160/395, 392, 327; 47/17

(56) References Cited

U.S. PATENT DOCUMENTS 4,841,688 A * 6/1989 Rinaldi ........................... 52/63
4,853,264 A * 8/1989 Vincent et al. ............... 428/34

* cited by examiner

Primary Examiner—Carl D. Friedman
Assistant Examiner—Naoko Slack

(57) ABSTRACT

A solarium includes window panel frames for supporting a plurality of window panels. Each window panel frame comprises a set of frame members defining a first surface, a diametrically opposed second surface, and a pair of third surfaces extending therebetween. The third surfaces define a third surface connecting recess positioned adjacent their corresponding intersection with the first surfaces. The window panels are made of thin and flexible sheets of material, such as heat shrinkable polymeric resin. A panel locking component is attached to the marginal edges of the window panels. The panels are undersized relative to the window frames when not mounted thereto, are secured to the window panel frame using the panel locking components, and then heat shrunk to a tensed state.

25 Claims, 6 Drawing Sheets

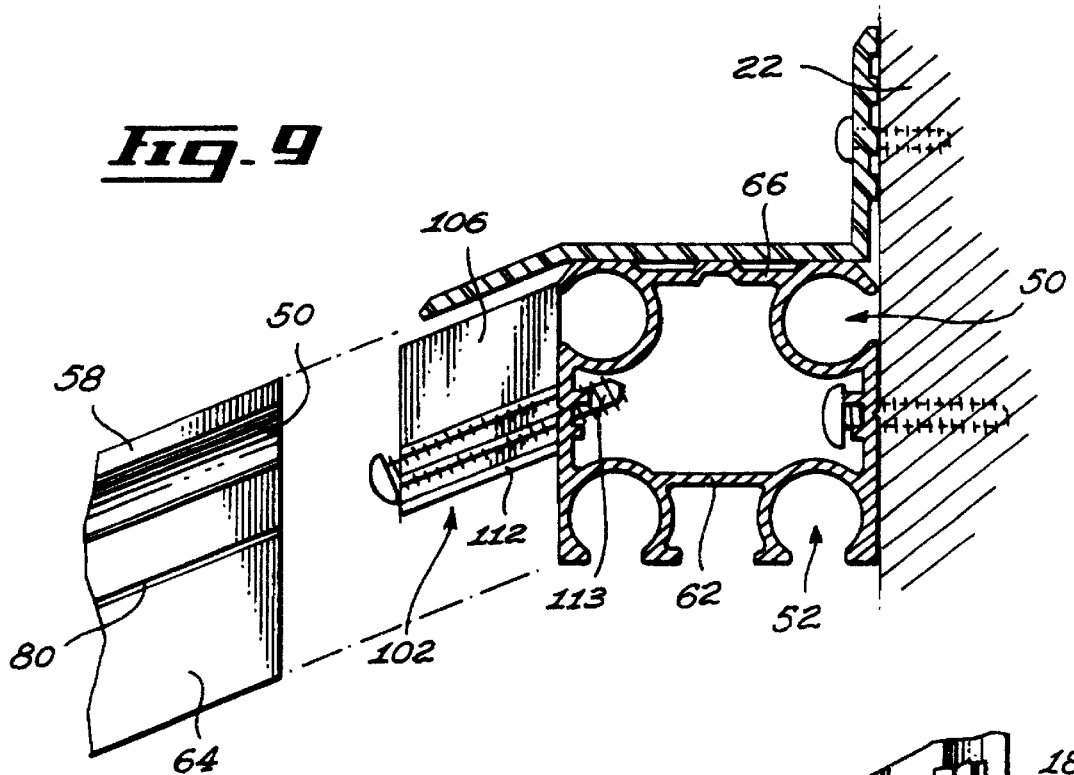
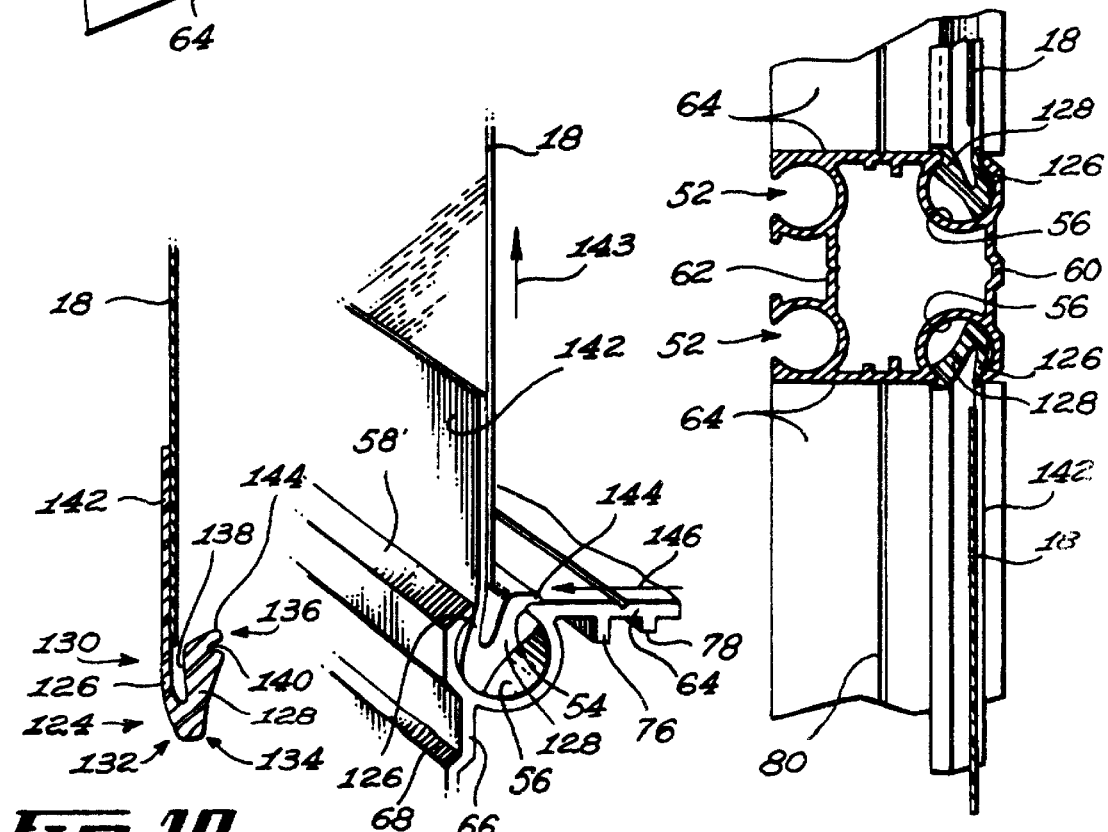

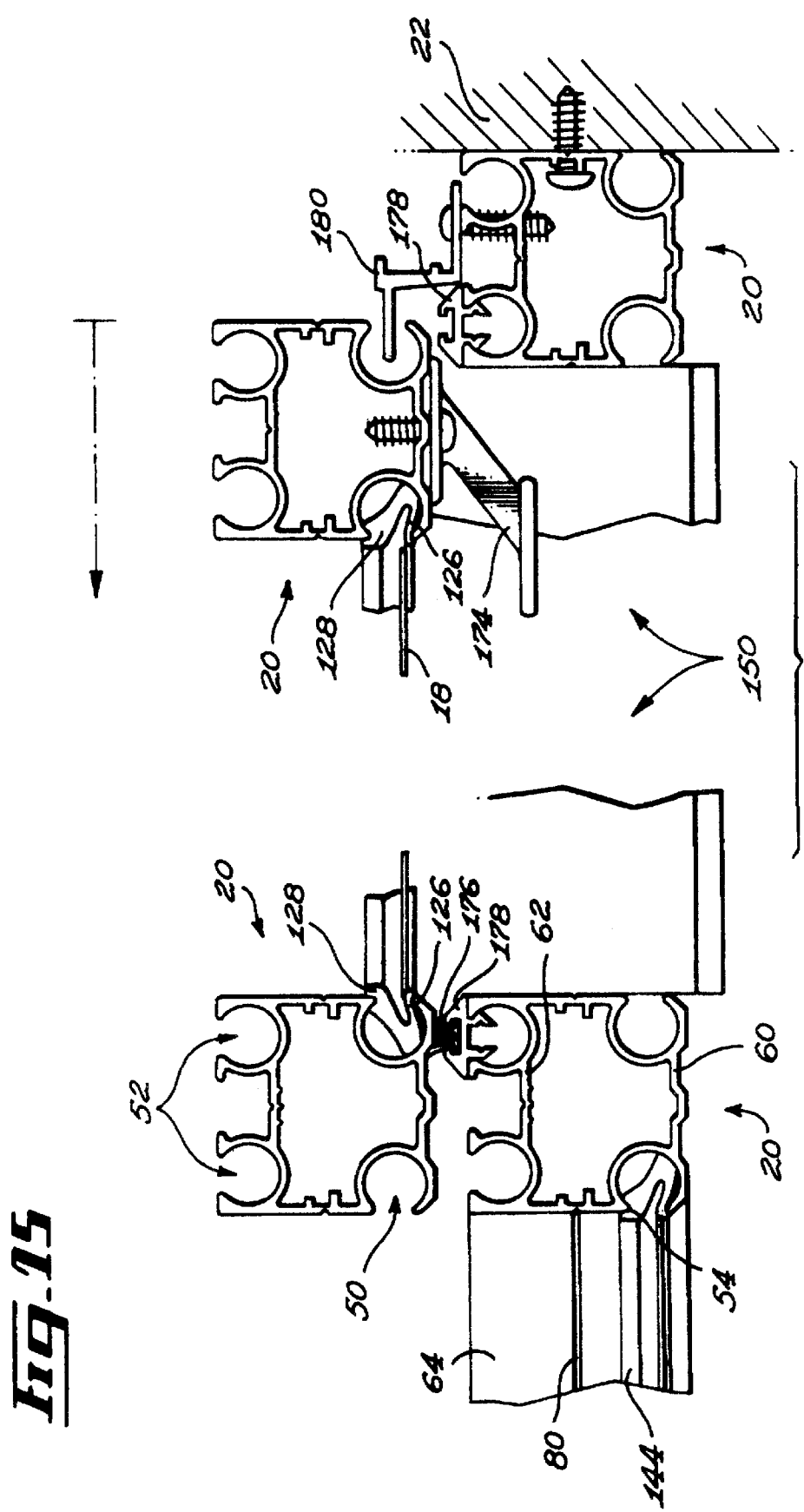

MODULAR SOLARIUM KIT COMPRISING FRAME MEMBERS WITH ARCUATE RECESSES AND FLEXIBLE, HEAT SHRINKING WINDOW PANELS WITH LOCKING EDGE FRAMES

FIELD OF THE INVENTION

The present invention relates to the general field of solariums and is particularly concerned with a modular solarium and a kit for constructing the same.

BACKGROUND OF THE INVENTION

Relatively recent social trends such as so-called "cocooning" have concurrently lead to an increased interest in household comfort related items. One feature which recently became increasingly popular is the so-called solarium or sunroom, an extension formed primarily of transparent or translucent panels forming a light transmitting enclosure.

Also, in consideration of new housing prices, many households are constructing additions or otherwise remodeling their existing homes to add features which were unavailable or unaffordable at purchase rather than purchasing newer homes. In many cases, the owner of the home or property prefers to perform the work him or herself rather than incurring the expense of hiring a professional to do the work.

While this may be feasible in the case of standard construction, specialized work such as glazing large panels for a solarium is generally beyond the average handyman. Thus, when labor costs are added to the cost of the materials, quite often solarium additions are beyond the budget of the home or property owner. Further, because of the great amount of labor involved, the construction of conventional solariums takes a relatively long time, for example a few days or more even by skilled professionals.

The prior art is replete with various patents disclosing solarium building kits attempting to circumvent the hereinabove mentioned problems. However, most prior art structures suffer from a set of drawbacks including undue weight creating the need for costly foundations, overall mechanical complexity leading to relatively high production costs and low reliability. Prior art structures also often suffer from aesthetically deterring appearances and overly complex assembly procedures. Accordingly, there exists a need for an improved modular solarium and kit for constructing the same.

Advantages of the present invention includes that the proposed structure is adapted to provide a light transmitting enclosure which facilitates the passage of the sun's rays into the enclosure and thereby increases the amount of sunlight and heat collected within the latter. Also, the proposed structure is of a modular nature and can be sold as a kit which can be readily assembled using easy and ergonomic steps without requiring special tooling or manual dexterity. Further, the proposed structure is designed so as to allow for customization of its configuration. It may be constructed in a variety of shapes and sizes that are esthetically pleasing in appearance.

Still further, once assembled, the proposed solarium is designed so as to form a structurally stable structure adapted to withstand harsh environmental factors such as strong winds, heavy rain or snowfalls, high temperature differentials and the like. Furthermore, the proposed solarium is designed so as to be readily mountable adjacent existing structures such as the exterior wall of a conventional household without substantially altering or damaging the latter.

Also, the proposed structure is designed so as to be relatively light weight thus reducing the need for foundations or other horizontal vertical support structures. Indeed, the proposed structure preferably incorporates translucent or transparent panels made out of flexible polymeric material instead of the conventional solarium glass panels used mostly in the prior art. The replacement of conventional glass panels by flexible polymeric films not only substantially reduces the overall weight of the structure and potentially reduces overall manufacturing costs but also provides interesting thermal, sealing and/or structural characteristics.

Still further, the proposed structure is provided with a frame having frame members with a specifically designed cross-sectional configuration. This specific configuration provides a relatively low weight to stability ratio. It also offers interesting bending characteristics in a predetermined geometrical plane that facilitates longitudinal forming thereof. Also, the profile configuration is designed so as to optimize the connection between the transparent or translucent panels attached thereto and its own integral connecting sections.

The profile configuration further allows for customized positioning of the respective components and the addition of optional add-ons such as sliding windows, doors, screens and the like. Furthermore, the proposed solarium is adapted to be manufacturable using conventional forms of manufacturing thus providing a solarium which will be economically feasible, long lasting and relatively trouble free.

In accordance with an embodiment of the present invention there is provided a solarium comprising a frame for supporting at least one window panel, the frame including a set of generally elongated frame members, each of the frame members having a generally rectangular cross-sectional configuration defining a frame member first peripheral surface, a substantially diametrically opposed frame member second peripheral surface and a pair of frame member third peripheral surfaces extending therebetween; at least one of the frame member third peripheral surfaces defining a corresponding third surface connecting recess positioned adjacent its corresponding intersection with the frame member first peripheral surface; at least one window panel mounted to the frame.

Preferably, the second surface and third surface connecting recesses have a generally truncated disc-shaped cross-sectional configuration defining at least one recess retaining edge.

Also, preferably, each of the connecting recesses has a pair of opposed retaining edges.

Further, each of the connecting recesses preferably defines a generally arcuate inner segment and a generally flat outer segment intersecting the inner segment.

Preferably, the intersection between the inner and outer segments defines a generally rounded contour.

Conveniently, the outer segment of the retaining edges part of the second surface connecting recesses extends in a generally perpendicular relationship relative to the frame member third peripheral surfaces.

Preferably, the outer segment of the retaining edges adjacent the frame member first peripheral surface part of the second surface connecting recesses extends at an angle relative to the frame member first peripheral surface.

Preferably, the frame member second peripheral surface defines at least one second surface connecting recess positioned adjacent its intersection with at least one of the frame member third peripheral surface.

Conveniently, the solarium further comprises a first spacing segment extending between the second surface connecting recesses, a second spacing segment extending between the second surface connecting recesses and a pair of third spacing segments each extending respectively between corresponding second surface and third surface connecting recesses.

Preferably, the solarium further comprises at least one guiding protuberance extending from an inner surface part of the third spacing segment.

Preferably, the solarium further includes a panel locking component attached to at least one edge of the window panel by a locking component-to-window panel attachment means; the panel locking component defining a first locking tongue and a second locking tongue; the first locking tongue and the second locking tongue defining a locking channel therebetween; the first locking tongue defining a first locking tongue first end and a first locking tongue second end; the second locking tongue defining a second locking tongue first end and a second locking tongue second end; the first and second locking tongues being pivotally attached together by an hinge means; the hinge means allowing the first and second locking tongues to pivot relative to each other between an unlocking configuration wherein they are in a relatively proximal relationship relative to each other and a locking configuration wherein they are in a substantially spaced relationship relative to each other.

Conveniently, the first locking tongue, the second locking tongue and the connecting recesses are configured and sized so that in the locking configuration the first or second locking tongues frictionally abut against the retaining edge thus creating a retaining force therebetween.

Preferably, the second locking tongue defines a locking groove formed on its outer surface adjacent the second locking tongue second end; the locking groove being configured and sized for substantially fittingly receiving the retaining edge therein when the panel locking component is suitably positioned within a connected recess and the first and second locking tongues are in the locking configuration.

Conveniently, the panel locking component further includes a biasing means for biasing the first locking tongue and the second locking tongue towards the locking configuration.

Preferably, the first locking tongue second end merges integrally with the second locking tongue first end at a merging area made out of a resilient material; whereby the merging area is adapted to act both as the hinge and biasing means.

Conveniently, the locking component-to-window panel attachment means includes a substantially flat attachment segment extending outwardly from the first locking tongue first end in a generally parallel relationship therewith.

Preferably, the window panel is made of a relatively thin and flexible sheet of material.

Conveniently, the window panel is configured and sized so as to be in a tense state when mounted to its corresponding window peripheral frame.

Preferably, the window panel is made of a material allowing selective size adjustment thereof; whereby the window panel is undersized relative to the window peripheral frame when not mounted thereto and whereby during the mounting operation the window panel is adapted to be first secured to the window frame and then shrunk to a tensed state.

Conveniently, the window panel is made out of a temperature shrinkable material.

The present invention also relates to an improvement in a solarium having a set of generally elongated frame members defining at least one window peripheral frame therebetween, the improvement wherein each of the frame members has a frame member outer surface; the frame member outer surface defining at least one connecting recess; a window panel mounted within the window peripheral frame; the window panel being made of a relatively thin and flexible sheet of material; the window panel being configured and sized so as to be in a tense state when mounted to the window peripheral frame.

The present invention further relates to a kit for forming a solarium, the kit comprising a set of generally elongated frame members defining at least one window peripheral frame therebetween, each of the frame members having a frame member outer surface; the frame member outer surface defining at least one connecting recess; a window panel mounted within the window peripheral frame; the window panel being made of a relatively thin and flexible sheet of material; the window panel being configured and sized so as to be in a tense state when mounted to the window peripheral frame.

The present invention still further relates to a method for constructing a solarium, the method comprising the steps of erecting a frame structure wherein the frame structure comprises a set of frame members together defining at least one window panel frame; securing a sheet locking component along marginal edges of a window panel; securing the sheet locking component to the window panel frame; shrinking the window panel until the latter reaches a tensioned state.

BRIEF DESCRIPTION OF THE DRAWINGS

An embodiment of the present invention will now be disclosed, by way of example, in reference to the following drawings in which:

FIG. 9, in a partial cross-sectional view with sections taken out taken along arrows IX—IX of FIG. 1, illustrates part of the connection between an upper section of the solarium shown in FIG. 1 and a vertical support surface such as a wall.

FIG. 10, in a partial cross-sectional view with sections taken out, illustrates part of a transparent panel having a panel connector mounted adjacent a peripheral edge thereof.

FIG. 11, in a partial perspective view with sections taken out, illustrates a section of transparent panel with its corresponding panel connector attached thereto mounted to a corresponding connector receiving section part of the structural beam shown in FIGS. 2 and 3.

FIG. 12, in a partial transversal cross-sectional view taken along arrows XII—XII of FIG. 1, illustrates the proximal peripheral sections of adjacent transparent panels mounted to a common structural beam such as shown in FIGS. 2 and 3.

FIG. 15, in a transversal cross-sectional view taken along arrows XV—XV of FIG. 1 and with sections taken out, illustrates the connection between the sliding door shown in FIG. 14 and the vertical components of the frame part of the solarium shown in FIG. 1.

DETAILED DESCRIPTION

Figure 1:
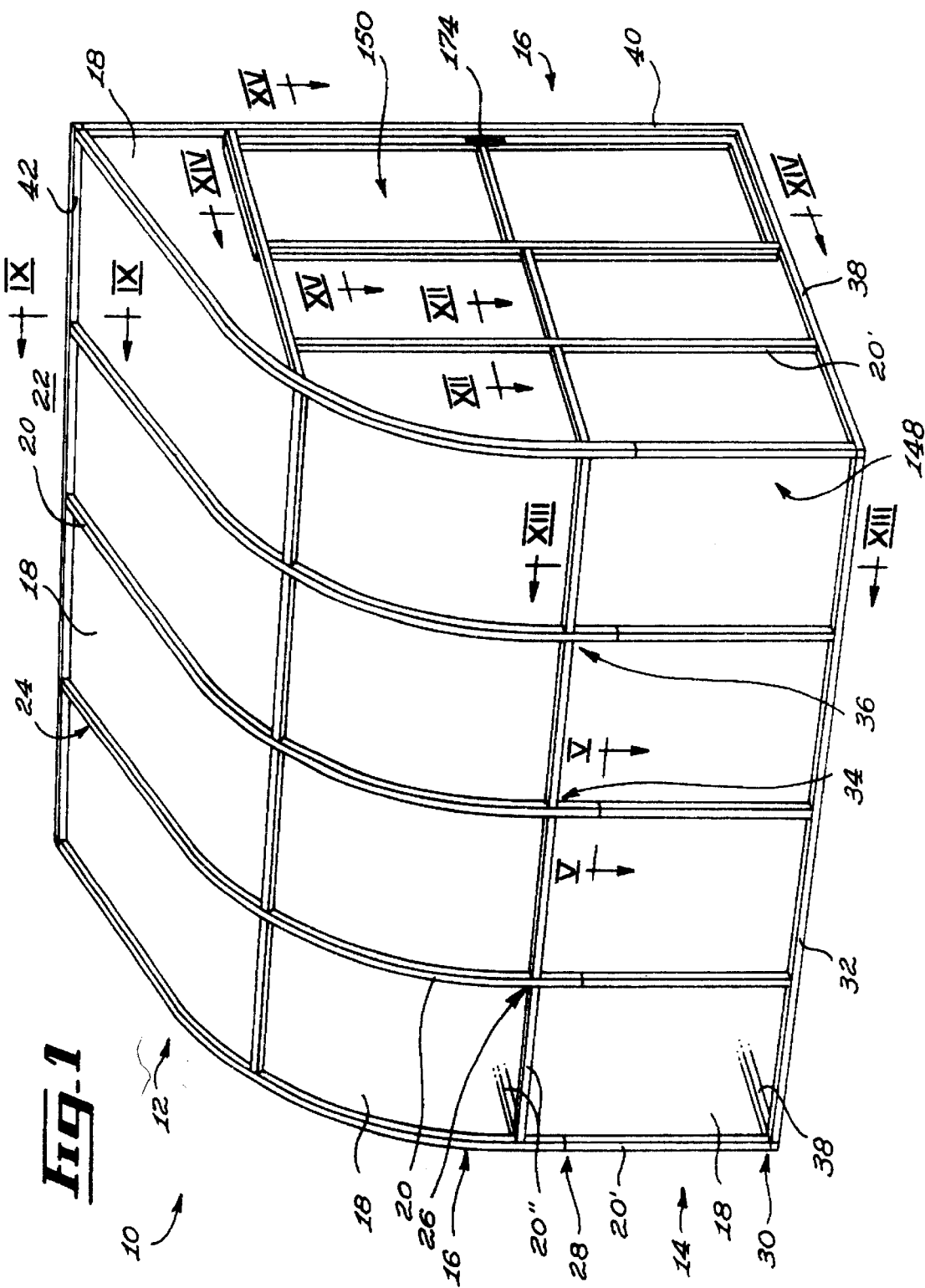
FIG. 1, in a schematic perspective view with sections taken out, illustrates a modular solarium in accordance with an embodiment of the present invention.

Referring to FIG. 1, there is shown a modular solarium 10 in accordance with an embodiment of the present invention. It should be understood that although the structure shown in FIGS. 1 through 15 has a generally arch-shaped upper section and defines both lateral and frontal walls, the solarium 10 could define other geometrical configurations and could exclude frontal and lateral partition walls therefrom without departing from the scope of the present invention. In the embodiment shown in FIG. 1, the solarium structure 10 defines a sloped and arched roof section 12 extending integrally into a front base section 14. The solarium 10 also defines at least one and preferably two lateral partition wall sections 16 (only one of which is shown in FIG. 1).

The roof section 12, the front base section 14 and the side sections 16 preferably all include relatively transparent or translucent window panels 18 each mounted within corresponding panel peripheral frames. Each panel peripheral frame typically includes a set of generally elongated tubular frame members 20. Each frame member 20, in turn, has a specifically designed and generally constant cross-sectional configuration which will be hereinafter disclosed in greater details.

Preferably, although by no means exclusively, the solarium structure 10 includes a first sub-set of frame members 20. The frame members 20 each have a generally longitudinally bent configuration that extends from a position adjacent a solarium vertical supporting surface 22 such as an exterior wall of a building to the base section 14. The frame members 20 are adapted to act as rafters in the roof section 12 and as mullions adjacent the base section 14.

Each frame member 20 is preferably formed out of an integral piece of material although it could be formed of end-to-end inter-connected frame members without departing from the scope of the present invention. The frame members 20 correspondingly define a first sub-set of proximal longitudinal ends 24 and a longitudinally opposed first sub-set of second longitudinal ends 26.

The solarium structure 10 also preferably includes a second sub-set of frame members 20' each having a generally rectilinear general configuration and adapted to act as mullions for the front base section 14 and the side sections 16. The frame members 20' correspondingly define a second sub-set of first longitudinal ends 28 and a longitudinally opposed second sub-set of second longitudinal ends 30. In the frontal wall, the first longitudinal ends 28 are adapted to be attached to corresponding second longitudinal ends 26 and the second longitudinal ends 30 are adapted to be attached to a front sill component 32 using corresponding connecting means which will be hereinafter disclosed.

The solarium structure 10 further includes a third sub-set of frame members 20". Each frame members 20" also has a generally rectilinear configuration and is adapted to extend transversally and generally horizontally between first and/or second frame members 20, 20'. The frame members 20" correspondingly defines a third sub-set of frame member first longitudinal ends 34 and a third subset of frame member second longitudinal ends 36. The first and second longitudinal ends 34, 36 are adapted to be respectively attached to first and/or second frame members 20, 20' by corresponding attaching means which will also be hereinafter disclosed in greater details. The solarium structure 10 preferably further includes side sill members 38, vertical wall mounting members 40 and horizontal wall mounting members 42.

Figure 2:
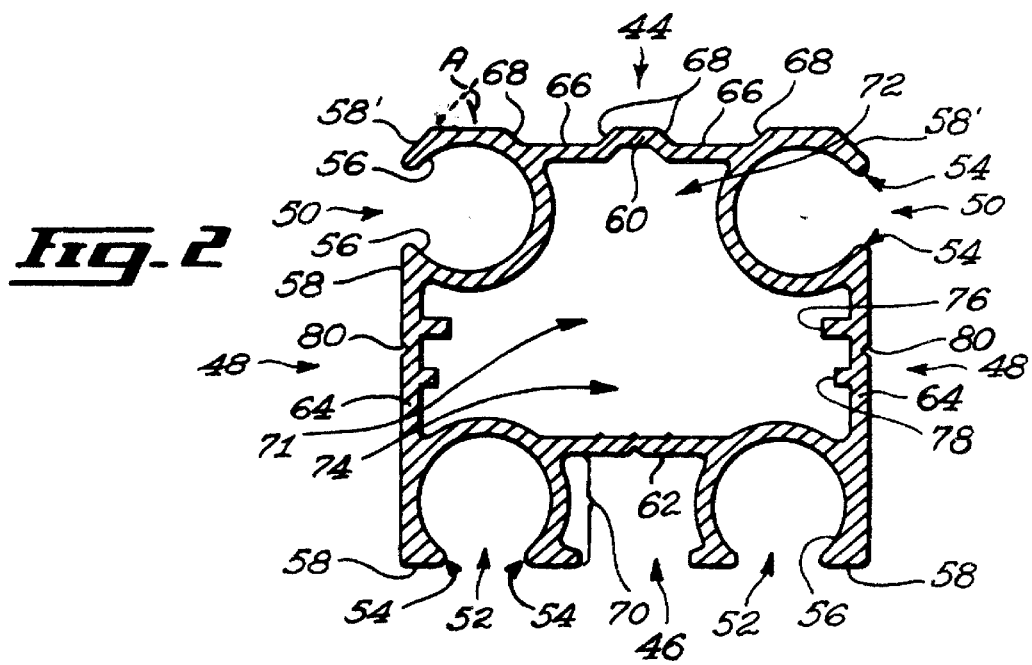
FIG. 2, in a transversal cross-sectional view, illustrates the geometric cross-sectional configuration of a structural beam part of the frame of the solarium shown in FIG. 1.
Figure 3:
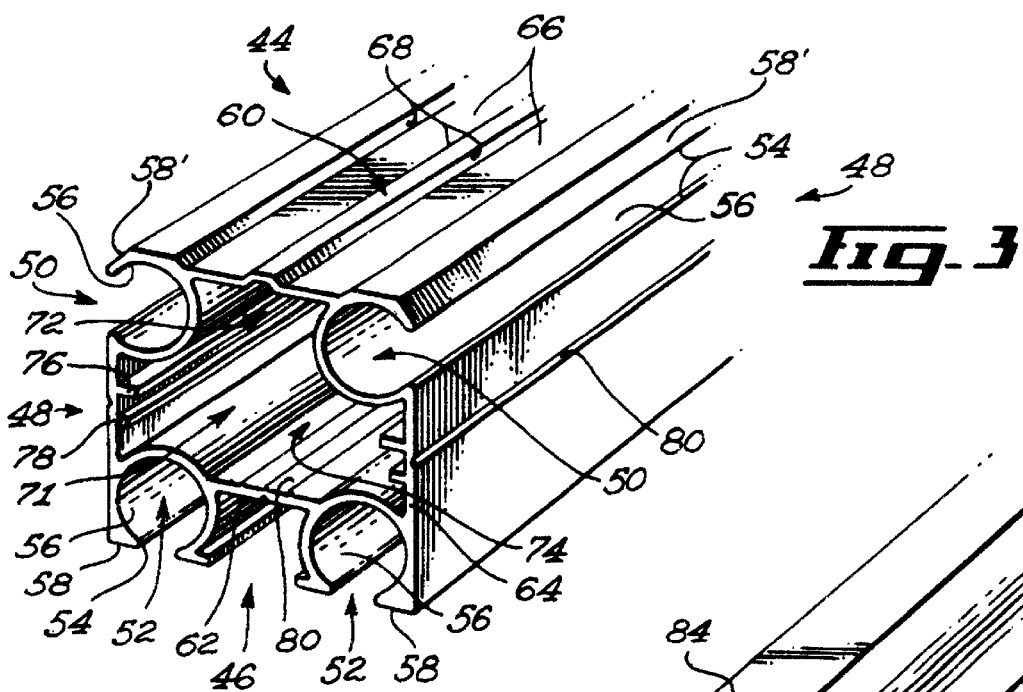
FIG. 3, in a partial perspective view with sections taken out, illustrates a longitudinal section of the structural beam shown in FIG. 2.

Referring now more specifically to FIGS. 2 and 3, there is shown in greater details the configuration of the frame members 20, 20' and 20" hereinafter referred to for simplicity as frame members 20. Each frame member 20 has a generally elongated configuration that may either be bent into a substantially arch configuration or remain rectilinear depending on its location in the frame of the solarium 10.

In transversal cross section, each frame member 20 has a generally rectangular, square or parallelogram peripheral configuration defining a frame member first peripheral surface 44, a diametrically opposed frame member second peripheral surface 46 and a pair of generally symmetrically disposed frame member third surfaces 48.

The frame member third surfaces 48 each extend respectively from corresponding end sections of the frame member first and second peripheral surfaces 44, 46 in a generally perpendicular relationship relative thereto. Preferably, although by now means exclusively the frame member first peripheral surface 44, the frame member second peripheral surface 46 and the frame members third peripheral surfaces 48 are respectively adapted to form the exterior, the interior and the lateral surfaces of the overall frame part of the solarium 10.

Each of the frame member third peripheral surfaces 48 defines a corresponding third surface connecting recess 50 preferably positioned adjacent a proximal intersection between the corresponding frame member third peripheral surface 48 and the frame member first peripheral surface 44. Also, the frame member second peripheral surface 46 defines at least one and preferably two second surface connecting recesses 52 positioned adjacent its intersection with at least one and preferably both of the frame member third peripheral surfaces 48.

Both the second surface and third surface connecting recesses 52, 50, preferably define tangentially truncated disc-shaped cross-sectional configurations, in turn, defining at least one and preferably two recess retaining edges 54. In a preferred embodiment of the invention, each retaining recess 50, 52 defines a pair of opposed and symmetrically disposed retaining edges 54.

Each of the retaining edges 54 typically has a generally arcuate inner segment 56 that intersects a generally flat outer segment 58. Preferably, the intersection between the inner segment 56 and the outer segment 58 has a generally rounded contour. Typically, although by no means exclusively, the inner segment 56 has a radius of curvature substantially in the range of ½". In the preferred embodiment, the outer segments 58 of the retaining edges 54 part of the second surface connecting recesses 52 extend in a generally perpendicular relationship relative to the adjacent frame member third peripheral surface 48.

Also, preferably, the outer segment 58' of the retaining edge 54 adjacent the frame member first peripheral surface 44 part of the third surface connecting recesses 50 extend generally at an angle A relative to both the frame member first and second peripheral surfaces 44, 48. Typically, although by no means exclusively, the angle A formed by the flat segment 58' has a value substantially in the range of 45°.

Each frame member 20 also includes a first spacing segment 60 extending between both third connecting recesses 50. Similarly, each frame member 20 also includes a second spacing segment 62 extending between both second surface connecting recesses 52 and a pair of third spacing segments 64 each extending between corresponding third surface and second surface connecting recesses 50, 52.

The first spacing segment 60 preferably defines a pair of symmetrically disposed lateral first segment channels 66 having inwardly beveled channel edges 68. The second spacing segment 62 preferably extends in a generally recessed relationship relative to the outer segments 58 part of the second surface connecting recesses 52. Typically, although by no means exclusively, the second spacing segment 62 extends in a proximal relationship with a tangential intersecting plane intercepting the inner surface of the radius of curvature of the connecting recesses 52. The second spacing segment 62 thus defines a clearance 70 between its outer peripheral surface and the outer peripheral surfaces of the outer segments 58.

Each frame member 20 thus defines a generally inverted "T" shaped and hollow member channel 71 extending longitudinally thereacross. The member channel defines a "T" leg section 72 and an inverted "T" bar section 74. The third spacing segments 64 each have a pair of guiding protrusions 76, 78 extending inwardly therefrom towards the inverted "T" bar section 74 of the longitudinal channel. Preferably, the length of the guiding protrusion 76 is relatively longer than that of the guiding protrusion 78. The second spacing segment 62 and both third spacing segment 64 are each preferably provided with a generally centrally located "V" shaped notch 80 formed on their respective outer surfaces.

Figure 4:
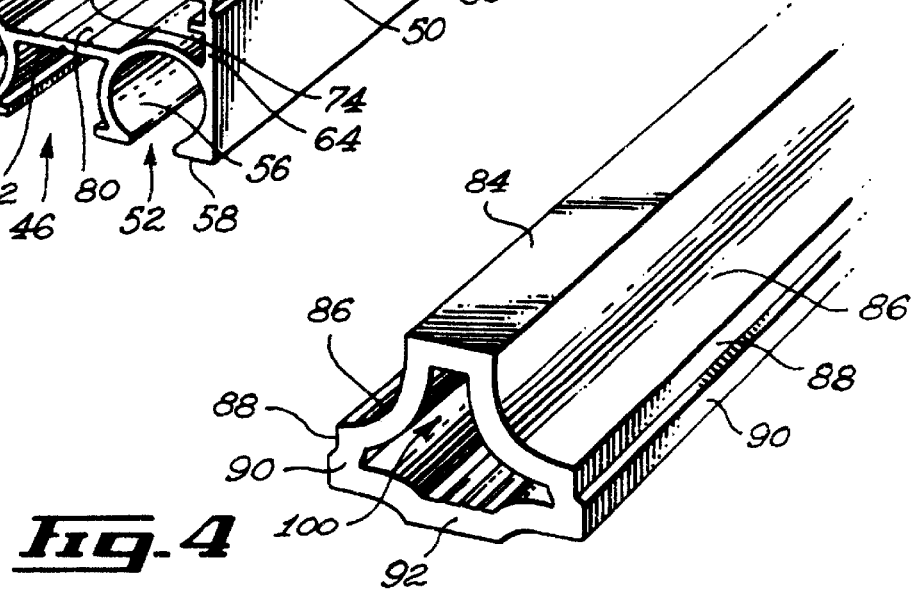
FIG. 4, in a partial perspective view with sections taken out, illustrates a section of a connecting component also used for building a solarium such as shown in FIG. 1.
Figure 5:
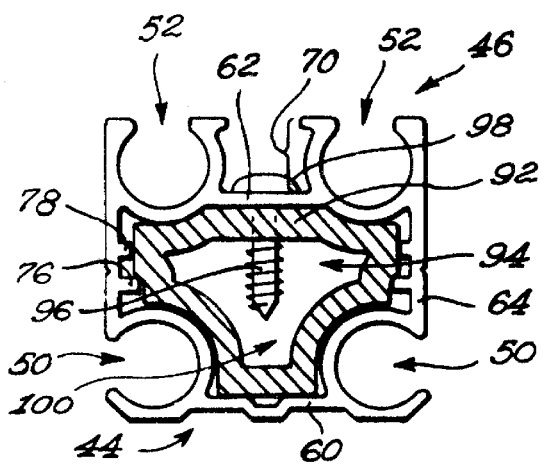
FIG. 5, in a partial cross-sectional view, illustrates the component shown in FIG. 4 mounted within a corresponding recess formed in a structural beam such as shown in FIGS. 2 and 3.
Figure 6:
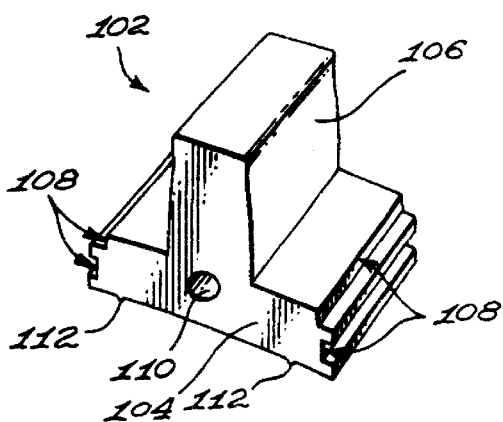
FIG. 6, in a perspective view, illustrates an end connector also used for forming a solarium such as shown in FIG. 1.

Referring now more specifically to FIGS. 4 and 5, there is shown an end-to-end connecting component 82. The end-to-end connecting component 82 has a generally elongated configuration. The end-to-end connecting component 82 is configured and sized so as to be slidably insertable within the longitudinal member channel 71. The end-to-end connecting component 82 is also configured and sized so that when it is inserted within a member channel 71 it will frictionally abut against the inner surfaces thereof. The end-to-end component 82 is preferably made out of a resiliently deformable material so that it can be resiliently deformed and fitted within a longitudinal member channel 71 thus increasing the frictional force therebetween. The end-to-end component 82 defines a first abutment segment 84 adapted to frictionally abut against the inner surface of the first spacing segment 60.

A pair of curved mating segments 86 extends integrally from the peripheral edges of the first abutment segment 84. The mating segments 86 are configured and sized for substantially matingly abutting against the inner surface of the arcuate segments part of the third surface connecting recesses 50. The end-to-end connecting component 82 further defines a pair of stepped third abutting segments 88, 90 respectively adapted to abuttingly contact the protuberances 76, 78. The end-to-end connecting component 82 still further defines a third abutment segment 92 adapted to substantially conform to the inner surface of the second spacing segment 62.

As shown in FIG. 5, when used to connect a pair of adjacent frame members 20 the end-to-end connecting component 82 may further be secured within the longitudinal channel using conventional fixing means such as a fixing screw 94. In such instances, the threaded stem 96 of the fixing screw 94 extends through corresponding apertures formed in both the second spacing segment 62 and the third abutment segment 92. The head 98 of the fixing screw 94 is enclosed within the clearance 70 so as not to protrude from the frame member second peripheral surface 46.

The end-to-end connecting component 82 also defines an end-to-end connecting component longitudinal channel 100. The channel 100 and the member channel 71 are adapted to cooperate so as not only to reduce the overall weight of the frame structure but also to act as sleeves for protectively guiding utility wires such as electrical cables or the like which may be used to power electric appliances provided inside the solarium 10 and attached to its frame.

Referring now more specifically to FIGS. 6 through 9, there is shown a perpendicular connecting components 102 also preferably part of the solarium in accordance with the present invention. The perpendicular connecting component 102 defines a generally "T"-shaped configuration adapted to be substantially fittingly inserted within the longitudinal member channels 71 defined by the frame members 20. The perpendicular connecting component 102 thus defines a generally parallelepiped-shaped connecting "T"-bar section 104. The connecting "T"-bar section 104 has a generally parallelepiped-shaped "T"-leg section 106 depending integrally and perpendicularly therefrom.

The distal ends of the connecting "T"-bar section 104 are preferably provided with indentations 108 configured and sized for receiving the protrusions 76, 78. The outer surface of the "T"-bar section 104 is preferably provided with abutment protrusions 112 for frictionally contacting the inner surface of the inner segments 56.

Figure 7:
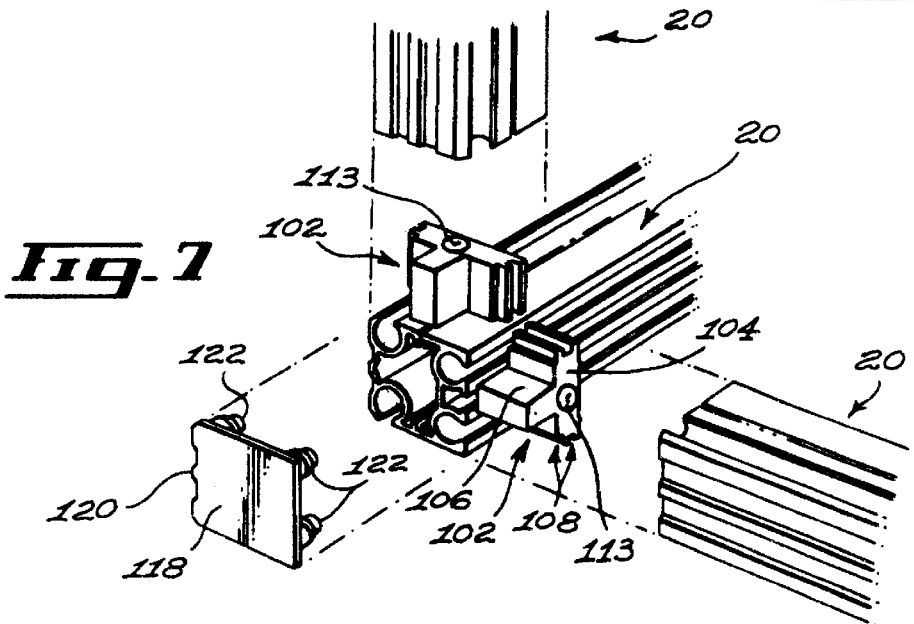
FIG. 7, in a partial perspective view with sections taken out, illustrates the end section of perpendicular structural beams such as shown in FIGS. 2 and 3 about to be connected together using connectors such as shown in FIG. 6.
Figure 8:
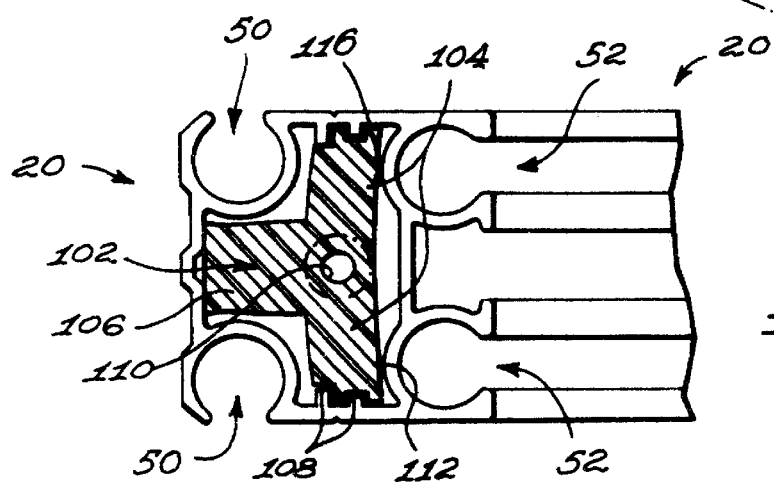
FIG. 8, in a partial perspective view with sections taken out, illustrates a connector such as shown in FIG. 6 inserted within a corresponding recess formed in the structural beam shown in FIGS. 2 and 3.
Figure 13:
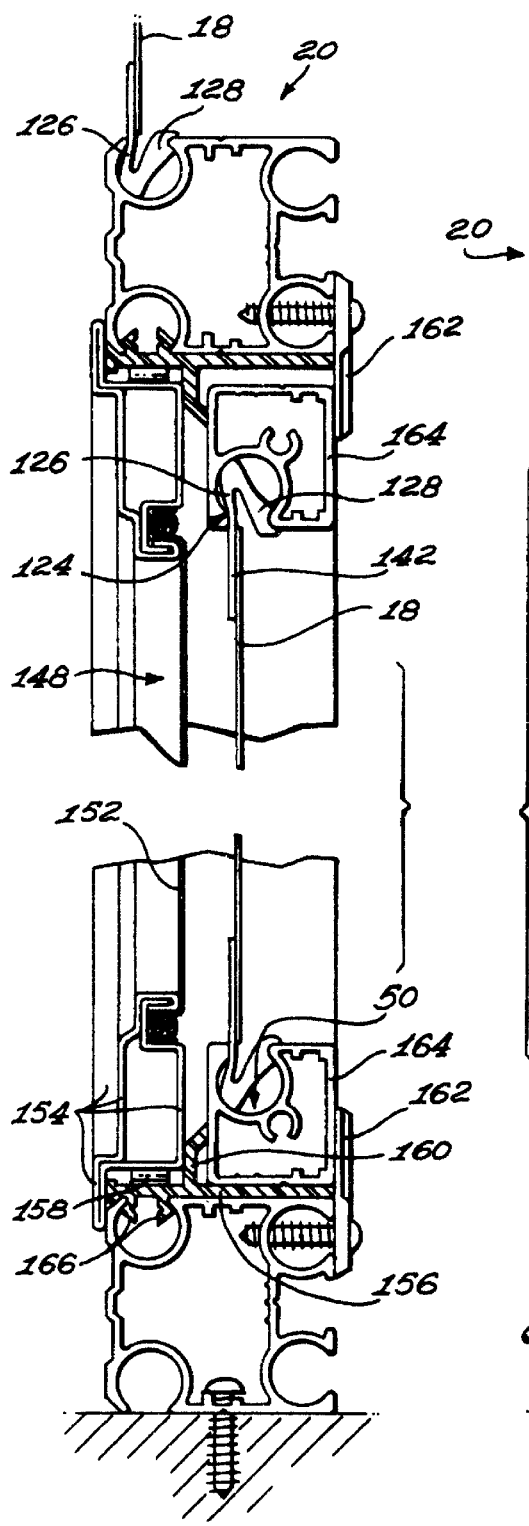
FIG. 13, in a transversal cross-sectional view taken along arrows XIII—XIII, illustrates part of a screen component mounted to a section of the frame of the solarium shown in FIG. 1.
Figure 14:
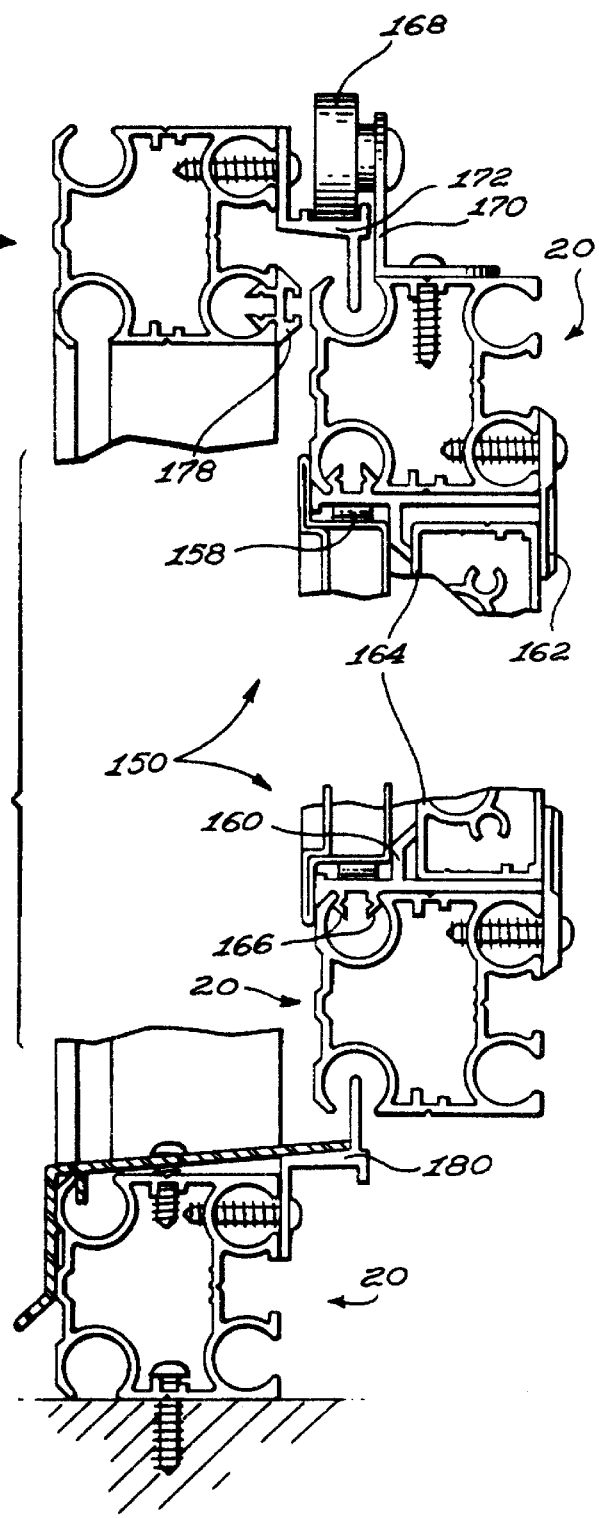
FIG. 14, in a partial transversal cross-sectional view taken along arrows XIV—XIV of FIG. 1 and with sections taken out, illustrates the connection between the frame section of the solarium shown in FIG. 1 and a corresponding sliding door mounted thereto.

The perpendicular connecting component 102 is further provided with a connecting aperture 110 extending transversally therethrough preferably adjacent the "T"-bar section 104. As shown in FIGS. 7 and 9, the connecting aperture 110 is adapted to receive a conventional fixing component such as a screw 113 for mounting the perpendicular connecting component 102 to the outer peripheral surfaces 46, 48 of the frame member 20. It should be noted that the lateral surfaces of the perpendicular connecting component 102 may be cut at an angle so as to allow connection of frame members 20 at angles other than 90° such as shown in FIG. 9.

As shown more specifically in FIG. 7 when frame members 20 are connected in a generally perpendicular relationship with each other the end section of the distal segment is preferably covered with a capping plate 118. Each capping plate 1 18 preferably has a lateral peripheral edge segment 120 adapted to conform to the contour of the first frame peripheral surface 44. Each capping plate 118 is also provided with mounting prongs 122 adapted to be releasably and snappingly inserted within the retaining recesses 50, 52.

Referring now more specifically to FIG. 10 through 12, there is shown in greater details part of a peripheral section of a window panel 18. Each window panel 18 is provided with a peripheral panel mounting means for releasably mounting the corresponding window panel 18 to the surrounding peripheral frame members 20. The panel mounting means preferably includes a generally "V"-shaped releasable locking component 124 attached to the peripheral edge of the window panel 18 by a locking component-to-window panel attachment means.

The panel locking component 124 defines a first locking tongue 126 and a second locking tongue 128. The first locking tongue 126 and the second locking tongue 128 define a locking channel 138 therebetween. The first locking tongue 126 defines a first locking tongue first end 130 and a first locking tongue second end 132. Similarly, the second locking tongue 128 defines a second locking tongue first end 134 and a second locking tongue second end 136. The first and second locking tongues 126, 128 are pivotally attached together by an hinge means preferably about their respective first ends 130, 134. The hinge means allows the first and second locking tongues 126, 128 to pivot relative to each other between an unlocking configuration shown in FIG. 10 wherein they are relatively proximal relationship relative to each other and a locking configuration illustrated in FIGS. 11 and 12 wherein they are in a substantially spaced relationship relative to each other.

The first locking tongue 126, the second locking tongue 128 and the connecting recesses 50, 52 are configured and sized so that in the unlocking configuration the first and second locking tongues 126, 128 can be easily at least partially inserted into and retracted from the connecting recesses 50, 52 without restriction from a retaining force therebetween. Also, the first locking tongue 126, the second locking tongue 128 and the connecting recesses 50, 52 are configured and sized so that in the locking configuration the first and second locking tongues 126, 128 frictionally abut against the retaining edges 54 thus creating a retaining force therebetween. The second locking tongue 128 preferably defines a locking groove 140 formed on its outer surface preferably adjacent the second locking tongue second end 136. The locking groove 140 is configured and sized for substantially fittingly receiving a retaining edge 54 therein when the panel locking component 124 is suitably positioned within a connected recess 50, 52 and the locking tongues 126, 128 are in the locking configuration.

In such a configuration, not only is a first retaining edge 54 securely received within the locking groove 140 but the opposing retaining edge 54 frictionally engages the outer surface of the locking tongue 126, even slightly deforming the latter inwardly as shown in FIG. 11, thus ensuring both the maintenance of the tension in the window panel 18 and the creation of a substantially leak-proof seal. Furthermore, the apex of the panel locking component 124 abuttingly and frictionally contact the inner surface of the inner segment 56 part of the connecting recess 50 further stabilizing the connection between the panel locking component 124 and the connecting recess 50. The apex of the panel locking component 124 is preferably configured so as to substantially conform to the abutment section part of the inner segment 56. Typically, in order to still further increase the locking action of the panel locking component 124, the second locking tongue 128 is relatively thicker then the first locking tongue 126.

The panel locking component 124 preferably further includes a biasing means for biasing the first locking tongue 126 and the second locking tongue 128 towards the locking configuration. In the preferred embodiment of the invention, the first locking tongue second end 132 merges integrally with the second locking tongue first end 134 at a merging area made out of a resilient material and adapted to act both as the hinge and biasing means. Typically although by no means exclusively, the merging area is made of a suitable elastomeric or polymeric resin.

The locking component-to-window panel attachment means preferably includes a substantially flat attachment segment 142 extending outwardly from the first locking tongue first end 130 preferably in a generally parallel relationship therewith. The first locking tongue 126 is preferably attached to the peripheral edge of the window panel 18 by the attachment segment 142 using suitable fastening means such as high frequency thermo-welding means, an adhesive means or any other suitable means.

Each window panel 18 is made out of a suitable translucent or transparent material. Each window panel 18 is preferably made out of a relatively thin, lightweight and flexible panel of material such as a thin sheet of suitably treated polymeric resin. Typically, although by no means exclusively, the window panels 18 are formed of polyvinyl chloride treated against premature ultra-violet aging. As mentioned previously, the use of relatively thin, lightweight and flexible sheets of material substantially reduces the overall weight of the solarium structure and substantially reduces the need for costly solarium supporting structures.

Each window panel 18 is configured and sized so as to be in a tense or taut state when mounted to its corresponding peripheral frame. In a preferred embodiment of the invention, each window panel 18 has an inherent self-tightening characteristic provided by inherent resiliency, temperature related shrinkage properties or any other suitable means. In one particular embodiment of the invention, the window panels 18 are made out of a material that dilates under predetermined heat stresses so as to facilitate mounting thereof to the peripheral frame and then shrinks back to a predetermined size at normal operational temperatures so as to ensure tenseness. Tenseness of the window panels 18 provides interesting visual and thermal properties. It also ensures a strong connection and a substantially tight seal between the window panels 18 and their respective peripheral frames.

When a window panel 18 is mounted to a corresponding peripheral frame member 20, one of the retaining edges 54 is resiliently inserted within the locking groove 140 while the opposite retaining edge 54 abuttingly contacts the body of the first locking tongue 126 preferably biasing the latter towards the second locking tongue as shown in FIG. 11. In this locked configuration any pressure imparted upon the window panel 18 is transmitted to the locking component in the form of a force schematically illustrated by the arrow 143 exerted in the direction of the geometrical plane formed by the window panel 18.

When the window panel 18 needs to be removed from its peripheral frame, the intended user merely needs to exert a pressure on a protruding segment 144 part of the second locking tongue 128 in a direction indicated by arrow 146 in FIG. 11. The force exerted on the protruding segment 144 allows the tongues 126, 128 to pivot about the merging area towards each other and thus allows resilient release of the retaining recess 54 from the locking groove 140.

The specific configuration of the locking tongues 126, 128 therefore not only allows for the easy installation and removal of window panels 18 from their corresponding peripheral frames but also allows for a strong locking action which is further increased by internal or external pressures exerted on the window panels 18 by wind, or other sources.

Furthermore, the combination of the resilient nature of the locking tongues and of their specific configuration which increases the frictional forces between the mounting means and the peripheral frame when the tongues are in their locked configuration provides a strong seal and thus a substantially leak proof connection which is even further increased in critical situations for example when high winds are combined with rain, snow or the like. The bond between the window mounting means and its associated peripheral frame is thus not only self solidifying, easy to remove but also substantially leak proof.

As shown more specifically in FIGS. 1 and 13 through 15, the specific cross-sectional configuration of the frame members 20 further allows for the latter to act as structural support for optional auxiliary panels such as a removable window screen 148, a sliding door 150 and the like.

The window screen 148 typically includes a mesh 152 having a peripheral mesh frame 154. The mesh frame 154 is mounted on a frame support 156 that includes a peripheral resilient pad 158. The frame support 156 also includes an integrally co-extruded elastomeric support leg 160 adapted to cooperate with a locking prong 162 for supporting therebetween a modified frame member 164 having a mounting channel 50. The frame support 156 further includes a resilient and substantially U-shaped clip 166 extending integrally therefrom for attachment to a mounting channel 50, 52.

The door 150 includes a set of supporting discs 168 rotatably attached by corresponding disc brackets 170. The supporting discs 168 are adapted to roll within guiding tracks 172. The door 150 may also include a door handle 174 and thermal strips 176 mounted within corresponding strip holders 178. Auxiliary guiding tracks 180 are preferably provided along with conventional door accessories.

The present invention relates not only to the structure of a novel solarium and kit for building the same but also to a novel method of constructing a solarium. This method for constructing a solarium includes the steps of initially erecting a frame structure wherein the frame structure includes a set of frame members together defining at least one and preferably a plurality of window openings. A panel locking component is secured along the marginal edge of a temperature shrinkable window panel. The next step involves heating the window panel so as to dilate the latter and then placing the window panel in one of the window opening with the panel locking component engaging the frame members. The window panel is then allowed to cool and shrink until is becomes tensed by the peripheral pulling action of the peripheral frame members to which it is attached.

Numerous modifications, variations and adaptations may be made to the specific embodiment hereinabove disclosed without departing from the scope of the invention as defined in the following claims.

The embodiments of the invention in which an exclusive privilege or property is claimed are defined as follows:

1. A solarium comprising:
   a frame for supporting at least one window panel, said frame including a set of generally elongated frame members, each of said frame members having a generally rectangular cross-sectional configuration defining a frame member first peripheral surface, a substantially diametrically opposed frame member second peripheral surface and a pair of frame member third peripheral surfaces extending therebetween; at least one of said frame member third peripheral surfaces defining a corresponding third surface connecting recess positioned adjacent its corresponding intersection with said frame member first peripheral surface; said frame member second peripheral surface defining at least one second surface connecting recess positioned adjacent its intersection with at least one of said frame member third peripheral surface; at least one window panel mounted to said frame.

2. A solarium as recited in claim 1 wherein said second surface and third surface connecting recesses have a generally truncated disc-shaped cross-sectional configuration defining at least one recess retaining edge.

3. A solarium as recited in claim 2 wherein each of said connecting recesses has a pair of opposed retaining edges.

4. A solarium as recited in claim 2 wherein each of said connecting recesses defines a generally arcuate inner segment and a generally flat outer segment intersecting said inner segment.

5. A solarium as recited in claim 4 wherein the intersection between said inner and outer segments defines a generally rounded contour.

6. A solarium as recited in claim 4 wherein said outer segment of said retaining edges part of said second surface connecting recesses extends in a generally perpendicular relationship relative to said frame member third peripheral surfaces.

7. A solarium as recited in claim 4 wherein said outer segment of said retaining edges adjacent said frame member first peripheral surface part of said second surface connecting recesses extends at an angle relative to said frame member first peripheral surface.

8. A solarium as recited in claim 1 further comprising a first spacing segment extending between said second surface connecting recesses, a second spacing segment extending between said second surface connecting recesses and a pair of third spacing segments each extending respectively between corresponding second surface and third surface connecting recesses.

9. A solarium as recited in claim 1 further comprising at least one guiding protuberance extending from an inner surface part of said third spacing segment.

10. A solarium as recited in claim 2 further including a panel locking component attached to at least one edge of said window panel by a locking component-to-window panel attachment means; said panel locking component defining a first locking tongue and a second locking tongue; said first locking tongue and said second locking tongue defining a locking channel therebetween; said first locking tongue defining a first locking tongue first end and a first locking tongue second end; said second locking tongue defining a second locking tongue first end and a second locking tongue second end; said first and second locking tongues being pivotally attached together by an hinge means; said hinge means allowing said first and second locking tongues to pivot relative to each other between an unlocking configuration wherein they are in a relatively proximal relationship relative to each other and a locking configuration wherein they are in a substantially spaced relationship relative to each other.

11. A solarium as recited in claim 10 wherein said first locking tongue, said second locking tongue and said connecting recesses are configured and sized so that in said locking configuration said first or second locking tongues frictionally abut against said retaining edge thus creating a retaining force therebetween.

12. A solarium as recited in claim 11 wherein said second locking tongue defines a locking groove formed on its outer surface adjacent said second locking tongue second end; said locking groove being configured and sized for substantially fittingly receiving said retaining edge therein when said panel locking component is suitably positioned within a connected recess and said first and second locking tongues are in said locking configuration.

13. A solarium as recited in claim 10 wherein said panel locking component further includes a biasing means for biasing said first locking tongue and said second locking tongue towards said locking configuration.

14. A solarium as recited in claim 13 wherein said first locking tongue second end merges integrally with said second locking tongue first end at a merging area made out of a resilient material; whereby said merging area is adapted to act both as said hinge and biasing means.

15. A solarium as recited in claim 10 wherein said locking component-to-window panel attachment means includes a substantially flat attachment segment extending outwardly from said first locking tongue first end in a generally parallel relationship therewith.

16. A solarium as recited in claim 1 wherein said window panel is made of a relatively thin and flexible sheet of material and wherein said window panel is configured and sized so as to be in a tense state when mounted to its corresponding window peripheral frame.

17. A solarium as recited in claim 16 wherein said window panel is made of a material allowing selective size adjustment thereof; whereby said window panel is undersized relative to said window peripheral frame when not mounted thereto and whereby during the mounting operation said window panel is adapted to be first secures to said window frame and then shrunk to a tensed state.

18. A solarium as recited in claim 17 wherein said window panel is made out of a temperature shrinkable material.

19. A solarium as recited in claim 16 wherein said window panel is made of a material allowing selective size adjustment thereof; whereby said window panel is undersized relative to said window peripheral frame when not mounted thereto and whereby during the mounting operation said window panel is adapted to be first heated so as to expand, once expanded said window panel is secured to said window frame and then allowed to cool so as to shrink to a tensed state.

20. In a solarium having a set of generally elongated frame members defining at least one window peripheral frame therebetween, the improvement wherein each of said frame members has a frame member outer surface; said frame member outer surface defining at least one connecting recess; a window panel mounted within said window peripheral frame; said window panel being made of a relatively thin and flexible sheet of material; said window panel being configured and sized so as to be in a tense state when mounted to said window peripheral frame.

21. The improvement of claim 19 further including a panel locking component attached to at least one edge of said window panel by a locking component-to-window panel attachment means; said panel locking component defining a first locking tongue and a second locking tongue; said first locking tongue and said second locking tongue defining a locking channel therebetween; said first locking tongue defining a first locking tongue first end and a first locking tongue second end; said second locking tongue defining a second locking tongue first end and a second locking tongue second end; said first and second locking tongues being pivotally attached together by an hinge means; said hinge means allowing said first and second locking tongues to pivot relative to each other between an unlocking configuration wherein they are in a relatively proximal relationship relative to each other and a locking configuration wherein they are in a substantially spaced relationship relative to each other.

22. A kit for forming a solarium, said kit comprising a set of generally elongated frame members defining at least one window peripheral frame therebetween, each of said frame members having a frame member outer surface; said frame member outer surface defining at least one connecting recess; a window panel mounted within said window peripheral frame; said window panel being made of a relatively thin and flexible sheet of material; said window panel being configured and sized so as to be in a tense state when mounted to said window peripheral frame.

23. A method for constructing a solarium, said method comprising the steps of:

erecting a frame structure wherein said frame structure comprises a set of frame members together defining at least one window panel frame;

securing a sheet locking component along marginal edges of a window panel;

securing said sheet locking component to said window panel frame;

shrinking said window panel until the latter reaches a tensioned state.

24. A solarium comprising:

a frame for supporting at least one window panel, said frame including a set of generally elongated frame members, each of said frame members having a generally rectangular cross-sectional configuration defining a frame member first peripheral surface, a substantially diametrically opposed frame member second peripheral surface and a pair of frame member third peripheral surfaces extending therebetween; at least one of said frame member third peripheral surfaces defining a corresponding third surface connecting recess positioned adjacent its corresponding intersection with said frame member first peripheral surface; at least one window panel mounted to said frame; said second surface and third surface connecting recesses having a generally truncated disc-shaped cross-sectional configuration defining at least one recess retaining edge;

a panel locking component being attached to at least one edge of said window panel by a locking component-to-window panel attachment means; said panel locking component defining a first locking tongue and a second locking tongue; said first locking tongue and said second locking tongue defining a locking channel therebetween; said first locking tongue defining a first locking tongue first end and a first locking tongue second end; said second locking tongue defining a second locking tongue first end and a second locking tongue second end; said first and second locking tongues being pivotally attached together by an hinge means; said hinge means allowing said first and second locking tongues to pivot relative to each other between an unlocking configuration wherein they are in a relatively proximal relationship relative to each other and a locking configuration wherein they are in a substantially spaced relationship relative to each other;

said first locking tongue, said second locking tongue and said connecting recesses being configured and sized so that in said locking configuration said first or second locking tongues frictionally abut against said retaining edge thus creating a retaining force therebetween;

said second locking tongue defining a locking groove formed on its outer surface adjacent said second locking tongue second end; said locking groove being configured and sized for substantially fittingly receiving said retaining edge therein when said panel locking component is suitably positioned within a connected recess and said first and second locking tongues are in said locking configuration.

25. A method for constructing a solarium, said method comprising the steps of:

erecting a frame structure wherein said frame structure comprises a set of frame members together defining at least one window panel frame;

securing a sheet locking component along marginal edges of a window panel, said window panel being undersized relative to said window panel frame when not mounted thereto;

securing said sheet locking component to said window panel frame;

heating said window panel so as to expand the latter to a size allowing it to be mounted to said at least one window panel frame;

mounting said window panel in its expanded state to said at least one window panel frame;

allowing said window panel to cool down and to shrink to a tensioned state.

* * * * *